US011117422B2

(12) United States Patent
Tsuji

(10) Patent No.: US 11,117,422 B2
(45) Date of Patent: Sep. 14, 2021

(54) NON-PNEUMATIC TIRE

(71) Applicant: TOYO TIRE & RUBBER CO., LTD., Itami (JP)

(72) Inventor: Noriyuki Tsuji, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 381 days.

(21) Appl. No.: 16/117,376

(22) Filed: Aug. 30, 2018

(65) Prior Publication Data
US 2019/0070903 A1 Mar. 7, 2019

(30) Foreign Application Priority Data

Sep. 7, 2017 (JP) .............................. JP2017-172041

(51) Int. Cl.
*B60C 7/14* (2006.01)
*B60C 7/10* (2006.01)

(52) U.S. Cl.
CPC ............... *B60C 7/14* (2013.01); *B60C 7/102* (2013.01); *B60C 2007/107* (2013.01); *B60C 2007/146* (2013.01)

(58) Field of Classification Search
CPC ..... B60C 7/14; B60C 7/102; B60C 2007/146; B60C 2007/107
See application file for complete search history.

(56) References Cited

U.S. PATENT DOCUMENTS 3,018,809 A * 1/1962 Bernard ................ B60C 15/028
152/41
4,921,029 A * 5/1990 Palinkas .................. B60C 7/26
152/11

(Continued)

FOREIGN PATENT DOCUMENTS

EP 0353006 A2 1/1990
JP H01-285403 A 11/1989

(Continued)

OTHER PUBLICATIONS

Office Action dated Mar. 16, 2020, issued in counterpart CN application No. 201810951964.2, with English tanslation. (12 pages).

(Continued)

*Primary Examiner* — Kip T Kotter
(74) *Attorney, Agent, or Firm* — Westerman, Hattori, Daniels & Adrian, LLP

(57) ABSTRACT

A non-pneumatic tire includes a support structure for supporting a load from a vehicle. The support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another, the plurality of connecting portions are configured such that elongated plate-like first connecting portions and elongated plate-like second connecting portions are arrayed along the tire circumferential direction, an angle α and an angle β, the angles being formed by an inner circumferential surface of the outer annular portion and both side surfaces of each of the connecting portions, both surfaces facing the tire circumferential direction, are 75° or more and 120° or less.

5 Claims, 4 Drawing Sheets

(56) References Cited

U.S. PATENT DOCUMENTS

| | | | |
|---|---|---|---|
| 4,934,425 A | 6/1990 | Gajewski et al. | |
| 5,265,659 A | 11/1993 | Pajtas et al. | |
| 2017/0341464 A1* | 11/2017 | Nishida | B60C 7/14 |
| 2018/0093527 A1 | 4/2018 | Iwamura et al. | |
| 2019/0061428 A1* | 2/2019 | Iwamura | B60C 7/18 |
| 2020/0039293 A1* | 2/2020 | Cron | B60C 7/18 |

FOREIGN PATENT DOCUMENTS

| | | | |
|---|---|---|---|
| JP | H02-182501 A | | 7/1990 |
| JP | 6-40201 A | | 2/1994 |
| JP | 2014-118116 A | | 6/2014 |
| JP | 2015039986 A | * | 3/2015 |
| JP | 2015-120440 A | | 7/2015 |
| JP | 2017-007380 A | | 1/2017 |

OTHER PUBLICATIONS

Office Action dated Apr. 9, 2021, issued in counterpart JP Application No. 2017-172041, with English Translation. (8 pages).

* cited by examiner

NON-PNEUMATIC TIRE

BACKGROUND OF THE INVENTION

Field of the Invention

The present invention relates to a non-pneumatic tire provided with, as a tire structural member, a support structure for supporting a load from a vehicle. Preferably, the present invention relates to a non-pneumatic tire usable as a substitute for a pneumatic tire.

Description of the Related Art

As conventional non-pneumatic tires, for example, there are a solid tire, a spring tire, a cushion tire, and the like. These non-pneumatic tires do not have excellent performance of a pneumatic tire.

Patent Document 1 describes a non-pneumatic tire including: an inner annular portion; an outer annular portion provided concentrically on an outer side of the inner annular portion; and a plurality of connecting portions which connect the inner annular portion and the outer annular portion to each other and are provided independently of one another in a tire circumferential direction. In Patent Document 1, the plurality of connecting portions are composed in such a manner that first connecting portions and second connecting portions are arrayed alternately with each other in the tire circumferential direction. The first connecting portions are extended from one side in a tire width direction of the inner annular portion to other side in a tire width direction of the outer annular portion. The second connecting portions are extended from other side in the tire width direction of the inner annular portion to one side in the tire width direction of the outer annular portion. When viewed in the tire width direction, the first connecting portions and the second connecting portions are inclined to the same side with respect to a tire radial direction, whereby an input from a road surface is attenuated sufficiently to improve noise performance.

Moreover, Patent Document 2 describes a non-pneumatic tire including: an outer hoop and an inner hoop, which are connected to each other by a web in a radially separated relationship; and ribs which intersect the web on both sides thereof and are inclined opposite to each other. Moreover, Patent Document 3 describes an airless tire including: a cylindrical tread ring having a ground contact surface; a hub disposed radially inward of the tread ring; and spokes connecting the tread ring and the hub to each other.

Incidentally, in the non-pneumatic tires having such spoke structure as in Patent Documents 1 to 3, there is a problem of reduction in durability of the non-pneumatic tire due to heat generation of the spokes during tire rolling. Therefore, a spoke shape that suppresses heat generation is desired. However, depending on the spoke shape, there is a possibility that distortion concentration may rather lead to the reduction in the durability. Patent Documents 1 to 3 never consider such a relationship between the heat generation of the spokes and the durability of the non-pneumatic tire.

PRIOR ART DOCUMENTS

Patent Documents

Patent Document 1: JP-A-2014-118116
Patent Document 2: JP-A-6-40201
Patent Document 3: JP-A-2015-120440

SUMMARY OF THE INVENTION

Accordingly, it is an object of the present invention to provide a non-pneumatic tire capable of improving the durability by suppressing the heat generation during the tire rolling.

The above object can be achieved by the present invention as described below.

More specifically, a non-pneumatic tire according to the present invention is a non-pneumatic tire including a support structure for supporting a load from a vehicle, wherein the support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another, the plurality of connecting portions are configured such that elongated plate-like first connecting portions and elongated plate-like second connecting portions are arrayed along the tire circumferential direction, the first connecting portions being extended from one side in a tire width direction of the inner annular portion to other side in a tire width direction of the outer annular portion, and the second connecting portions being extended from other side in the tire width direction of the inner annular portion to one side in the tire width direction of the outer annular portion, and at a tire radial direction outer end of each of the connecting portions coupled to the outer annular portion, an angle $\alpha$ and an angle $\beta$, the angles being formed by an inner circumferential surface of the outer annular portion and both side surfaces of each of the connecting portions, both surfaces facing the tire circumferential direction, are 75° or more and 120° or less.

In the present invention, the angle $\alpha$ and the angle $\beta$ may be different from each other.

In the present invention, the angle $\alpha$ and the angle $\beta$ may be equal to each other.

In the present invention, the angle $\alpha$ and the angle $\beta$ may be 90° or more.

A non-pneumatic tire according to the present invention includes: an inner annular portion; an outer annular portion concentrically provided on an outer side of the inner annular portion; and a plurality of connecting portions connecting the inner annular portion and the outer annular portion to each other. The plurality of connecting portions are configured such that a plurality of first connecting portions and a plurality of second connecting portions are arrayed in a tire circumferential direction. The first connecting portions are extended from one side in a tire width direction of the inner annular portion to other side in a tire width direction of the outer annular portion, and the second connecting portions are extended from other side in the tire width direction of the inner annular portion to one side in the tire width direction of the outer annular portion. In the present invention, at a tire radial direction outer end of each of the connecting portions (first connecting portions and second connecting portions) coupled to the outer annular portion, an angle $\alpha$ and an angle $\beta$, which are formed by an inner circumferential surface of the outer annular portion and both side surfaces of each of the connecting portions, both surfaces facing the tire circumferential direction, are 75° or more and 120° or less. As a result of extensive studies, the inventor of the present invention has found that, when the angle formed by the side surfaces of each of the connecting portions and the inner circumferential surface of the outer annular portion remains within this range, the durability does not decrease and the heat dissipation due to a turbulence effect is ensured. Therefore, in accordance with the present invention, the heat generation during the tire rolling can be suppressed to improve the durability.

BRIEF DESCRIPTION OF THE DRAWINGS FIG

DETAILED DESCRIPTION OF THE PREFERRED EMBODIMENTS

Figure 1:
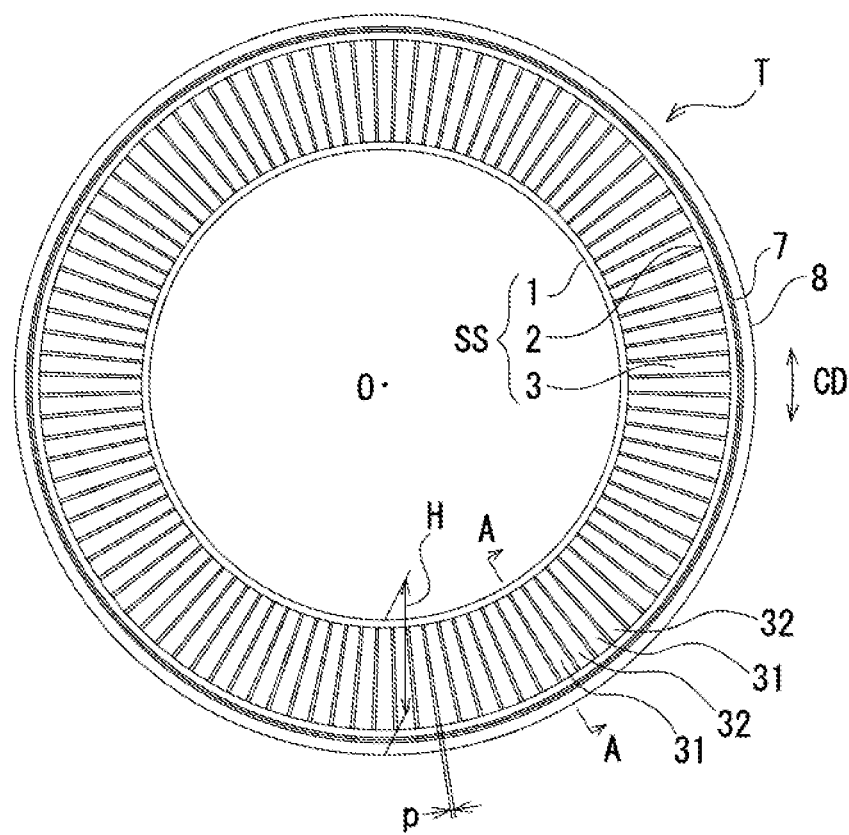
FIG. 1 is a front view showing an example of a non-pneumatic tire of the present invention.
Figure 2A:
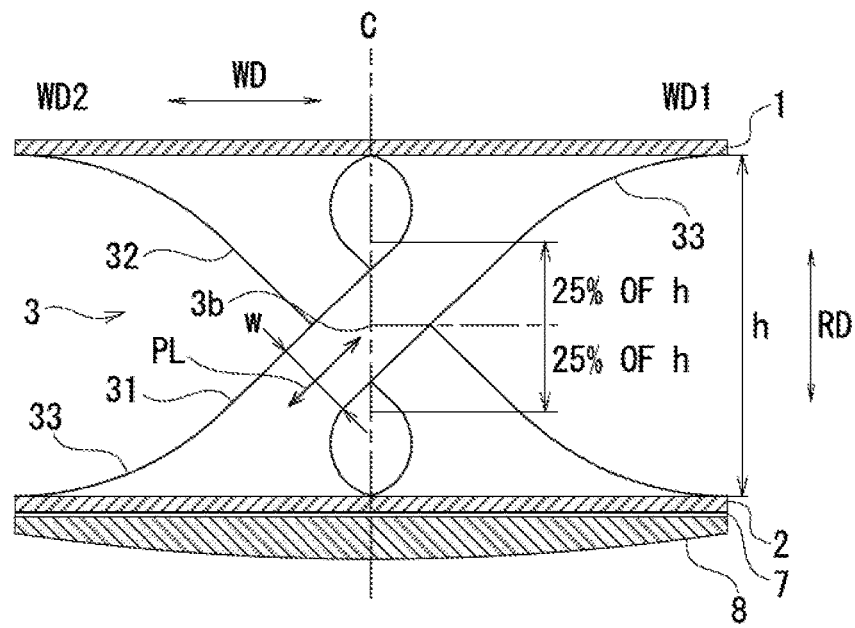
FIG. 2A is a cross-sectional view taken along a line A-A of the non-pneumatic tire of FIG. 1.
Figure 2B:
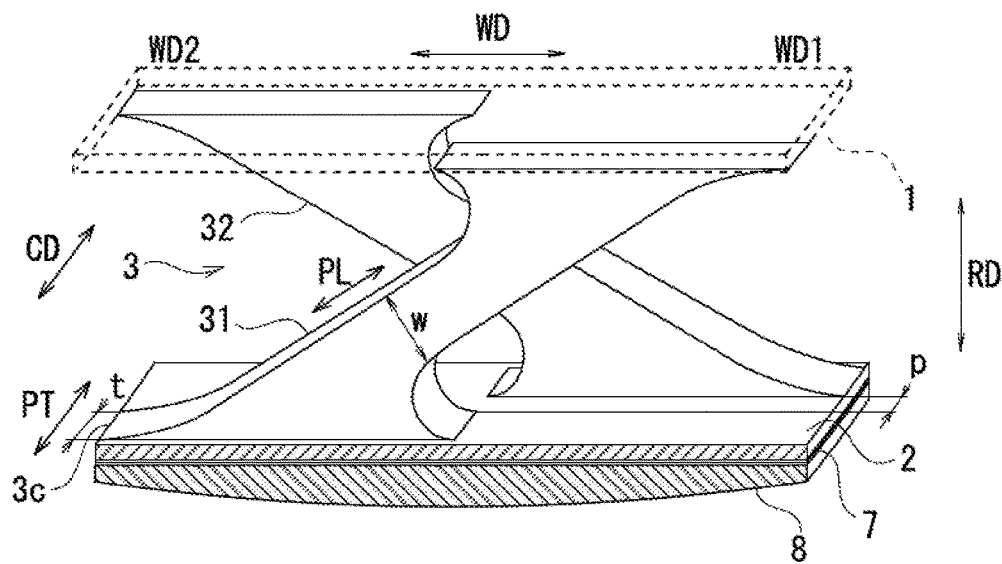
FIG. 2B is a perspective view showing a part of the non-pneumatic tire of FIG. 1.
Figure 3:
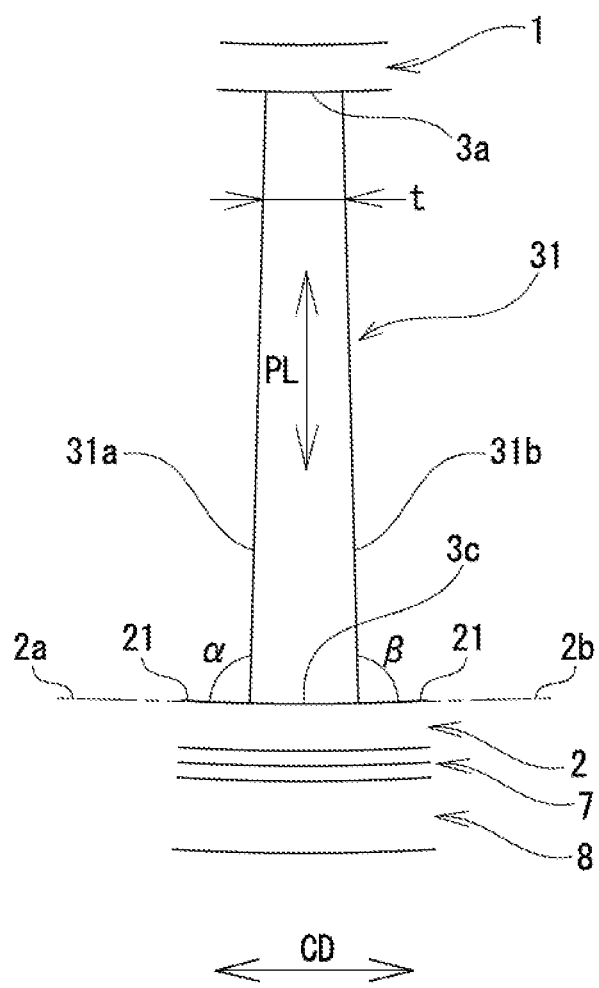
FIG. 3 is a partially enlarged view of the non-pneumatic tire of FIG. 1.

Hereinafter, embodiments of the present invention will be described with reference to the drawings. First, a configuration of a non-pneumatic tire T of the present invention will be described. FIG. 1 is a front view showing an example of the non-pneumatic tire T. FIG. 2A is a cross-sectional view taken along a line A-A of FIG. 1, and FIG. 2B is a perspective view showing a part of the non-pneumatic tire. FIG. 3 is an enlarged view of a part of FIG. 1. Here, reference symbol O denotes an axis, and reference symbol H denotes a cross-sectional height of the tire.

The non-pneumatic tire T is provided with a support structure SS for supporting a load from a vehicle. The non-pneumatic tire T of the present invention just needs to be provided with such a support structure SS as described above. A member corresponding to the tread, a reinforcing layer, members for accommodation to an axle and a rim may be provided on an outer side (outer circumference side) and inner side (inner circumference side) of the support structure SS.

As shown in the front view of FIG. 1, in the non-pneumatic tire T of this embodiment the support structure SS includes: an inner annular portion 1; an outer annular portion 2 provided concentrically on an outer side of the inner annular portion 1; and a plurality of connecting portions 3 which connect the inner annular portion 1 and the outer annular portion 2 to each other and are provided independently of one another in a tire circumferential direction CD.

From a viewpoint of improving uniformity, it is preferable that the inner annular portion 1 have a cylindrical shape with a constant thickness. Moreover, on an inner circumferential surface of the inner annular portion 1, it is preferable to provide irregularities and the like for maintaining fitting property in order to mount the non-pneumatic tire T to the axle and the rim.

The thickness of the inner annular portion 1 is preferably 2 to 10% of the cross-sectional height H of the tire, more preferably 3 to 9% thereof from a viewpoint of achieving weight reduction and improvement of durability while sufficiently transmitting force to the connecting portions 3.

An inner diameter of the inner annular portion 1 is appropriately determined according to dimensions of the rim and the axle on which the non-pneumatic tire T is to be mounted, and the like. However, when substitution for a general pneumatic tire is assumed, the inner diameter is preferably 250 to 500 mm, more preferably 320 to 440 mm.

A width of the inner annular portion 1 in a tire width direction is appropriately determined depending on a purpose, a length of the axle, and the like. However, when the substitution for a general pneumatic tire is assumed, the width is preferably 100 to 300 mm, more preferably 120 to 250 mm.

A tensile modulus of the inner annular portion 1 is preferably 5 to 180,000 MPa, more preferably 7 to 50,000 MPa from a viewpoint of achieving the weight reduction, the improvement of the durability and mounting easiness while sufficiently transmitting a force to the connecting portions 3. The tensile modulus in the present invention is a value calculated from a tensile stress at 10% elongation after conducting a tensile test according to JIS K7312.

The support structure SS in the present invention is formed of an elastic material. From a viewpoint of enabling integral molding at the time of manufacturing the support structure SS, it is preferable that the inner annular portion 1, the outer annular portion 2, and the connecting portion 3 be basically made of the same material except a reinforcing structure.

The elastic material in the present invention refers to a material in which the tensile modulus calculated from the tensile stress at 10% elongation after conducting the tensile test according to JIS K7312 is 100 MPa or less. In the elastic material of the present invention, the tensile modulus is preferably 5 to 100 MPa, more preferably 7 to 50 MPa from a viewpoint of imparting appropriate rigidity while obtaining sufficient durability. Examples of the elastic material used as a base material include thermoplastic elastomer, crosslinked rubber, and other resins.

Examples of the thermoplastic elastomer include polyester elastomer, polyolefin elastomer, polyamide elastomer, polystyrene elastomer, polyvinyl chloride elastomer, and polyurethane elastomer. Examples of a rubber material that composes the crosslinked rubber material include not only natural rubber but also synthetic rubber such as styrene butadiene rubber (SBR), butadiene rubber (BR), isoprene rubber (IIR), nitrile rubber (NBR), hydrogenated nitrile rubber (hydrogenated NBR), chloroprene rubber (CR), ethylene propylene rubber (EPDM), fluororubber, silicone rubber, acrylic rubber, and urethane rubber. Two or more of these rubber materials may be used in combination according to needs.

Examples of other resins include thermoplastic resin and thermosetting resin. Examples of the thermoplastic resin include polyethylene resin, polystyrene resin, and polyvinyl chloride resin. Examples of the thermosetting resin include epoxy resin, phenol resin, polyurethane resin, silicone resin, polyimide resin, and melamine resin.

Among the above elastic materials, the polyurethane resin is preferably used from viewpoints of moldability and processability and cost. As the elastic material, a foamed material may be used, and those obtained by foaming the above thermoplastic elastomer, crosslinked rubber, and other resins are usable.

In the support structure SS integrally molded with the elastic material, it is preferable that the inner annular portion 1, the outer annular portion 2, and the connecting portions 3 be reinforced by reinforcing fiber.

Examples of the reinforcing fiber include reinforcing fibers such as long fiber, short fiber, woven fabric, and nonwoven fabric. However, as a mode of using the long fiber, it is preferable to use net-like fiber aggregate composed of pieces of fiber, which are arrayed in the tire width direction, and of pieces of fiber, which are arrayed in the tire circumferential direction.

Examples of the reinforcing fiber include a rayon cord, a polyamide cord such as nylon-6,6, a polyester cord such as polyethylene terephthalate, an aramid cord, a glass fiber cord, a carbon fiber, and a steel cord.

In the present invention, in addition to the reinforcement using the reinforcing fiber, it is possible to perform reinforcement using a granular filler or reinforcement using a metal ring or the like. Examples of the granular filler include carbon black, silica, ceramics such as alumina, and other inorganic fillers.

From the viewpoint of improving the uniformity, it is preferable that the outer annular portion 2 have a cylindrical shape with a constant thickness. The thickness of the outer annular portion 2 is preferably 2 to 20% of the cross-sectional height H of the tire, more preferably 10 to 15% thereof from the viewpoint of achieving the weight reduction and the improvement of the durability while sufficiently transmitting force from the connecting portions 3.

An inner diameter of the outer annular portion 2 is appropriately determined depending on a purpose and the like. However, when the substitution for a general pneumatic tire is considered, the inner diameter is preferably 420 to 750 mm, more preferably 470 to 680 mm.

A width of the outer annular portion 2 in the tire width direction is appropriately determined depending on the purpose and the like. However, when the substitution for a general pneumatic tire is considered, the width is preferably 100 to 300 mm, more preferably 120 to 250 mm.

When a reinforcing layer 7 is provided on an outer circumference of the outer annular portion 2 as shown in FIG. 1, the tensile modulus of the outer annular portion 2 can be set to the same degree as the inner annular portion 1. When such a reinforcing layer 7 is not provided, the tensile modulus of the outer annular portion 2 is preferably 5 to 180,000 MPa, more preferably 7 to 50,000 MPa from a viewpoint of achieving the weight reduction and the improvement of the durability while sufficiently transmitting the force from the connecting portions 3.

When increasing the tensile modulus of the outer annular portion 2, a fiber-reinforced material in which an elastic material is reinforced by fiber and the like is preferably used. By reinforcing the outer annular portion 2 by reinforcing fiber, the outer annular portion 2 is also sufficiently adhered to a belt layer and the like.

The connecting portions 3 connect the inner annular portion 1 and the outer annular portion 2 to each other. The connecting portions 3 are plural and provided independently of one another in the tire circumferential direction CD at appropriate intervals between the inner annular portion 1 and the outer annular portion 2.

The plural connecting portions 3 are configured such that first connecting portions 31 and second connecting portions 32 are arrayed along the tire circumferential direction CD. In this case, it is preferable that the first connecting portions 31 and the second connecting portions 32 are arrayed alternately with each other along the tire circumferential direction CD. This makes it possible to further reduce the dispersion of the ground contact pressure during the tire rolling.

From the viewpoint of improving the uniformity, it is preferable that a pitch p in the tire circumferential direction CD between each of the first connecting portions 31 and each of the second connecting portions 32 be set constant. The pitch p is preferably 0 to 10 mm, more preferably 0 to 5 mm. When the pitch p is larger than 10 mm, the ground contact pressure becomes uneven, which may cause noise to increase.

Each of the first connecting portions 31 is extended from one side WD1 in the tire width direction of the inner annular portion 1 toward other side WD2 in the tire width direction of the outer annular portion 2. Meanwhile, each of the second connecting portions 32 is extended from the other side WD2 in the tire width direction of the inner annular portion 1 toward one side WD1 in the tire width direction of the outer annular portion 2. That is, the first connecting portion 31 and the second connecting portion 32, which are adjacent to each other, are disposed in a substantially X shape when viewed in the tire circumferential direction CD.

The first connecting portion 31 and the second connecting portion 32 when viewed in the tire circumferential direction CD are preferably symmetric to each other with respect to a tire equatorial plane C as shown in FIG. 2A. Therefore, hereinafter, the first connecting portion 31 will mainly be described.

The first connecting portion 31 has an elongated plate-like shape extending from the inner annular portion 1 to the outer annular portion 2. In the first connecting portion 31, a plate thickness t is smaller than a plate width w, and a plate thickness direction PT is oriented to the tire circumferential direction CD. That is, the first connecting portion 31 has a plate shape extending in a tire radial direction RD and in a tire width direction WD. The first connecting portion 31 and the second connecting portion 32 are formed into such an elongated plate shape. In this way, even if the plate thickness t is reduced, the first connecting portion 31 and the second connecting portion 32 can obtain desired rigidity by setting the plate width w to be wide. Therefore, the durability can be improved. Moreover, the number of first connecting portions 31 and the number of second connecting portions 32 are increased while thinning the plate thickness t. In this way, gaps between the connecting portions adjacent to one another in the tire circumferential direction CD can be reduced while maintaining the rigidity of the entire tire. Therefore, the dispersion of the ground contact pressure during the tire rolling can be reduced.

As shown in FIG. 3, the first connecting portion 31 is coupled to the inner annular portion 1 at a tire radial direction inner end 3a, and is coupled to the outer annular portion 2 at a tire radial direction outer end 3c. Both side surfaces 31a and 31b of the first connecting portion 31 are flat surfaces, and the plate thickness t of the first connecting portion 31 gradually decreases from the outer annular portion 2 toward the inner annular portion 1. However, the plate thickness t of the first connecting portion 31 may be set constant along a longitudinal direction PL.

At the tire radial direction outer end 3c of the first connecting portion 31, an angle formed by one side surface 31a of the first connecting portion 31 facing the tire circumferential direction CD and an inner circumferential surface 21 of the outer annular portion 2 is defined as α, and an angle formed by other side surface 31b of the first connecting portion 31 and the inner circumferential surface 21 of the outer annular portion 2 is defined as β. More specifically, the angle α is an angle formed by the side surface 31a of the first connecting portion 31 and an imaginary plane 2a that passes through an intersection line of the side surface 31a and the inner circumferential surface 21 of the outer annular portion 2 and is in contact with the inner circumferential surface 21. In a similar way, an angle β is an angle formed by the side surface 31b of the first connecting portion 31 and an imaginary plane 2b that passes through an intersection line of the side surface 31b and the inner circumferential surface 21 of the outer annular portion 2 and is in contact with the inner circumferential surface 21.

The angle α and the angle β are 75° or more and 120° or less. Preferably, the angle α and the angle β are 90° or more. When the angle α and the angle β are less than 75°, distortion concentrates on the tire radial direction outer end 3c of the first connecting portion 31, and the durability decreases. Meanwhile, when the angle α and the angle β are larger than 120°, a turbulence effect is hard to obtain, and the durability decreases due to heat generation.

In the example of FIG. 3, the angle α and the angle β are equal to each other. The angle α and the angle β are equalized to each other, whereby the distortion occurring in the side surface 31a and side surface 31b of the first connecting portion 31 becomes uniform in the whole of the first connecting portion 31, so that the durability against the distortion becomes hard to decrease.

However, the angle α and the angle β may differ from each other. The angle α and the angle β are caused to differ from each other, whereby a tire having directionality can be formed. Moreover, the rigidity of the whole of the tire can be adjusted by differentiating the angle α and the angle β from each other. A difference between the angle α and the angle β is preferably 0 to 45°, more preferably 0 to 30°.

The plate thickness t is preferably from 8 to 30 mm, more preferably from 10 to 25 mm from the viewpoint of achieving the weight reduction and the improvement of the durability while sufficiently transmitting forces from the inner annular portion 1 and the outer annular portion 2.

The plate width w is preferably from 5 to 25 mm, more preferably from 10 to 20 mm from the viewpoint of achieving the weight reduction and the improvement of the durability while sufficiently transmitting the forces from the inner annular portion 1 and the outer annular portion 2. Moreover, the plate width w is preferably 110% or more of the plate thickness t, more preferably 115% or more thereof from a viewpoint of reducing the dispersion of the ground contact pressure while improving the durability.

Preferably, the first connecting portion 31 has reinforcing portions 33, in which a plate width gradually increases toward the inner annular portion 1 or the outer annular portion 2, in a vicinity of a joint portion with the inner annular portion 1 and in a vicinity of a joint portion with the outer annular portion 2. In this way, the durability of the first connecting portion 31 can be further improved. Preferably, a range in which each of the reinforcing portions 33 is provided is outside a range of ±25% of h from the tire radial direction center portion 3b of the first connecting portion 31. Moreover, the reinforcing portion 33 is provided in the thick portion 311 of the first connecting portion 31.

The number of the connecting portions 3 is preferably 80 to 300, more preferably 100 to 200 from a viewpoint of achieving the weight reduction, improvement of power transmission and the durability while sufficiently supporting the load from the vehicle. FIG. 1 shows an example in which 50 pieces of the first connecting portions 31 and 50 pieces of the second connecting portions 32 are provided.

A tensile modulus of the connecting portion 3 is preferably 5 to 180,000 MPa, more preferably 7 to 50,000 MPa from a viewpoint of achieving the weight reduction, the improvement of the durability and improvement of lateral rigidity while sufficiently transmitting the forces from the inner annular portion 1 and the outer annular portion 2. When increasing the tensile modulus of the connecting portion 3, a fiber-reinforced material in which an elastic material is reinforced by fiber and the like is preferably used.

In this embodiment, as shown in FIG. 1, there is shown an example in which the reinforcing layer 7 for making reinforcement against bending deformation of the outer annular portion 2 of the support structure SS is provided outside the outer annular portion 2. Moreover, in this embodiment, as shown in FIG. 1, an example in which a tread 8 is provided further outside the reinforcing layer 7 is shown. As the reinforcing layer 7 and the tread 8, it is possible to provide similar ones to a belt layer and a tread of the conventional pneumatic tire. The tread 8 may be made of resin. Further, as the tread pattern, it is possible to provide a similar pattern to the conventional pneumatic tire.

In the present invention, it is preferable to further dispose a width direction reinforcing layer for increasing the rigidity in the tire width direction between the tire radial direction outer end of the connecting portion 3 and the tread 8. This suppresses buckling at a tire width direction center portion of the outer annular portion 2 and makes it possible to further improve the durability of the connecting portions 3. The width direction reinforcing layer is buried in the outer annular portion 2 or disposed outside the outer annular portion 2. Examples of the width direction reinforcing layer include a stuff in which steel cords or cords made of fiber reinforced plastics such as carbon fiber reinforced plastics (CFRP) and glass fiber reinforced plastics (GFRP) are arrayed substantially parallel to the tire width direction, a cylindrical metal ring, and a cylindrical high-modulus resin ring.

Other Embodiment

Figure 4:
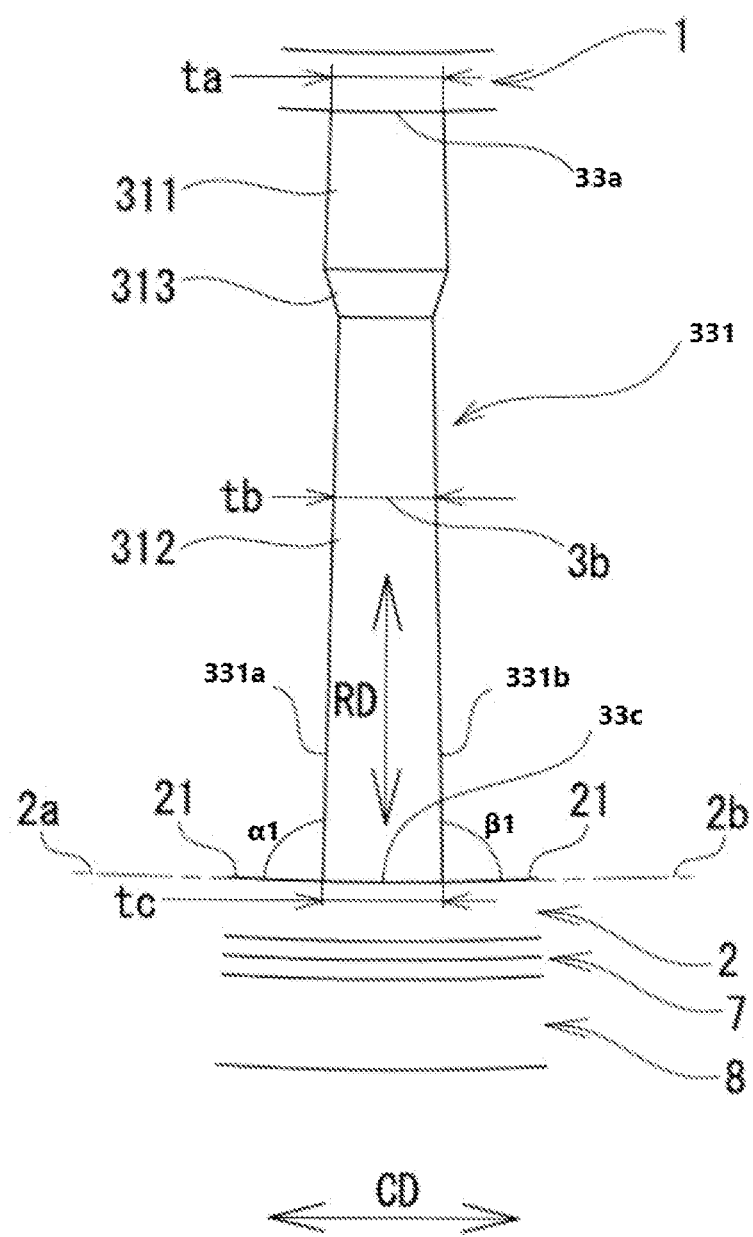
FIG. 4 is a partially enlarged view of the non-pneumatic tire according to another embodiment.

In the above embodiment, such an example is given, where both of the side faces 31a and 31b of the first connecting portion 31 are composed of planes continuing from the tire radial direction inner end 3a to the tire radial direction outer end 3c, and the plate thickness t of the first connecting portion 31 gradually decreases at a constant rate from the outer annular portion 2 toward the inner annular portion 1. However, the present invention is not limited to this example. As shown in FIG. 4, both side surfaces 331a and 331b of the first connecting portion 331 may be formed of other than the plane continuing from the tire radial direction inner end 33a to the tire radial direction outer end 33c.

The first connecting portion 331 includes: a thick portion 311 in which a plate thickness gradually increases from the tire radial direction inner end 33a toward the tire radial direction center portion 3b; a thin portion 312 in which a plate thickness gradually decreases from the tire radial direction outer end 33c toward the tire radial direction inner end 33a through the tire radial direction center portion 3b; and a tapered portion 313 thinned from the thick portion 311 to the thin portion 312. The thick portion 311 and the tapered portion 313 are located inward of the tire radial direction center portion 3b in the tire radial direction. Both side surfaces of the thick portion 311 in the tire circumferential direction CD extend radially along the tire radial direction RD, whereby the plate thickness of the thick portion 311 gradually increases toward the outside in the tire radial direction. Moreover, both side surfaces of the thin portion 312 in the tire circumferential direction CD extend radially along the tire radial direction RD, whereby the plate thickness of the thin portion 312 gradually decreases toward the inside in the tire radial direction. In this embodiment, the angle α1 is defined as an angle formed by the one side surface 331a of the thin portion 312 and the inner circumferential surface 21 of the outer annular portion 2, and the angle β1 is defined as an angle formed by the other side surface 331b of the thin portion 312 and the inner circumferential surface 21 of the outer annular portion 2.

In the first connecting portion 331, a plate thickness ta at the tire radial direction inner end 33a is larger than a plate thickness tb at the tire radial direction center portion 3b. As a result, bending of the first connecting portion 331 in a vicinity of the tire radial direction inner end 33a, that is, in a root portion on the inner annular portion 1 side is sup- pressed. Accordingly, even when a large load is applied to the tire, the tire radial direction center portion 3b can be prevented from largely bending and coming into contact with the tire radial direction center portion of the adjacent second connecting portion 32, and the durability can be further improved. The plate thickness ta is preferably 110% or more of the plate thickness tb, more preferably 120% or more.

Moreover, a plate thickness tc at the tire radial direction outer end 33c is larger than the plate thickness tb at the tire radial direction center portion 3b. Accordingly, in the first connecting portion 331, bending in a vicinity of the tire radial direction outer end 33c, that is, in a root portion on the outer annular portion 2 side is suppressed. Therefore, even when a large load is applied to the tire, the tire radial direction center portion 3b can be prevented from bending largely and coming into contact with the tire radial direction center portion of the adjacent second connecting portion 32, and the durability can be further improved. The plate thickness tc is preferably 110% or more of the plate thickness tb, more preferably 125% or more.

Moreover, the plate thickness tc at the tire radial direction outer end 33c is preferably larger than the plate thickness ta at the tire radial direction inner end 33a. That is, it is preferable that the plate thickness be set as: the plate thickness tc>the plate thickness ta>the plate thickness tb. The plate thickness tc is preferably 110% or more of the plate thickness ta, more preferably 115% or more.

Example

Example and the like which specifically show the configuration and effect of the present invention will be described below. The durability in each of Example and the like was measured as follows by a drum testing machine in accordance with FMVSS 109. A test speed was set constant at 80 km/h, and a distance traveled until a failure occurred was measured while applying a load divided into four gradually increasing steps. The distance traveled is indicated by an index when a distance traveled in Comparative example is 100, and a larger value is better.

EXAMPLES AND COMPARATIVE EXAMPLES

Non-pneumatic tires in each of which an angle α and an angle β are set to values shown in Table 1 were fabricated, and durability of each thereof was evaluated.

TABLE 1

|  | Comparative Example 1 | Comparative Example 2 | Comparative Example 3 | Example 1 | Example 2 | Example 3 |
|---|---|---|---|---|---|---|
| Angle α | 70 | 70 | 130 | 90 | 120 | 75 |
| Angle β | 130 | 70 | 130 | 90 | 120 | 75 |
| Durability | 100 | 84 | 95 | 110 | 106 | 102 |

From the results in Table 1, the following can be seen. In each of Examples 1 to 3, the durability was improved as compared with each of Comparative examples 1 to 3.

What is claimed is:

1. A non-pneumatic tire comprising a support structure for supporting a load from a vehicle,
wherein the support structure includes an inner annular portion, an outer annular portion concentrically provided on an outer side of the inner annular portion, and a plurality of connecting portions which connect the inner annular portion and the outer annular portion to each other and are provided in a tire circumferential direction independently of one another,
the plurality of connecting portions are configured such that elongated plate-like first connecting portions and elongated plate-like second connecting portions are arrayed along the tire circumferential direction, the first connecting portions being extended from one side in a tire width direction of the inner annular portion to other side in a tire width direction of the outer annular portion, and the second connecting portions being extended from the other side in the tire width direction of the inner annular portion to the one side in the tire width direction of the outer annular portion,
at a tire radial direction outer end of each of the connecting portions coupled to the outer annular portion, an angle $\alpha$ and an angle $\beta$, the angles being formed by an inner circumferential surface of the outer annular portion and both side surfaces of each of the connecting portions, both surfaces facing the tire circumferential direction, are 75° or more and 120° or less, and
wherein each of the connecting portions includes; a thick portion in which a plate thickness gradually increases from the tire radial direction inner end toward the tire radial direction center portion; a thin portion in which a plate thickness gradually decreases from the tire radial direction outer end toward the tire radial direction inner end through the tire radial direction center portion;
and a tapered portion thinned from the thick portion to the thin portion.

2. The non-pneumatic tire according to claim 1, wherein the angle $\alpha$ and the angle $\beta$ are different from each other.

3. The non-pneumatic tire according to claim 1, wherein the angle $\alpha$ and the angle $\beta$ are equal to each other.

4. The non-pneumatic tire according to claim 1, wherein the angle $\alpha$ and the angle $\beta$ are 90° or more.

5. The non-pneumatic tire according to claim 1, wherein a difference between the angle $\alpha$ and the angle $\beta$ is 0 to 45°.

* * * * *